US008474911B2

(12) United States Patent
Parker et al.

(10) Patent No.: US 8,474,911 B2
(45) Date of Patent: Jul. 2, 2013

(54) VEHICLE SEAT ASSEMBLY AND ACTUATOR SYSTEM FOR SAME

(75) Inventors: Grey B. Parker, Columbus, OH (US); Trenton Hobbs, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 298 days.

(21) Appl. No.: 13/004,989

(22) Filed: Jan. 12, 2011

(65) Prior Publication Data

US 2012/0175927 A1 Jul. 12, 2012

(51) Int. Cl.
*B60N 2/02* (2006.01)
(52) U.S. Cl.
USPC ............... 297/341; 297/311; 297/378.1
(58) Field of Classification Search
USPC ............ 297/311, 341, 344.11, 378.1, 378.12, 297/463.1
See application file for complete search history.

(56) References Cited

U.S. PATENT DOCUMENTS

| 4,900,088 A | | 2/1990 | Bechtle et al. | |
| 5,597,206 A | * | 1/1997 | Ainsworth et al. | 297/378.12 |
| 5,683,140 A | * | 11/1997 | Roth et al. | 297/344.1 |
| 6,923,504 B1 | | 8/2005 | Liu et al. | |
| 7,000,990 B1 | | 2/2006 | Liu et al. | |
| 7,029,063 B2 | * | 4/2006 | Holdampf | 297/15 |
| 7,350,870 B2 | | 4/2008 | Bates | |
| 7,434,884 B2 | * | 10/2008 | Becker et al. | 297/341 |
| 2007/0182231 A1 | * | 8/2007 | Lutzka et al. | 297/378.12 |
| 2009/0026791 A1 | * | 1/2009 | Ishijima et al. | 296/65.18 |
| 2009/0108640 A1 | | 4/2009 | Wieclawski | |
| 2009/0184555 A1 | | 7/2009 | Yetukuri et al. | |
| 2010/0133886 A1 | * | 6/2010 | Gi et al. | 297/341 |

* cited by examiner

*Primary Examiner* — David Dunn
*Assistant Examiner* — Philip Gabler
(74) *Attorney, Agent, or Firm* — Rankin, Hill & Clark LLP

(57) ABSTRACT

A vehicle seat assembly includes a seat back, a seat base, a first input lever, a second input lever, an actuator, a latching mechanism, and a system connecting the first input lever, the second input lever and the actuator. The seat base connects with the seat back and is mounted to a vehicle floor. The input levers each connect with at least one of the seat back and the seat base. The actuator connects with at least one of the seat back and the seat base. The latching mechanism is for selectively locking movement of the seat back with respect to the seat base or for selectively locking movement of the seat base with respect to the vehicle floor. The latching mechanism is operably connected with the actuator such that movement of the actuator results in movement of the latching mechanism. The first input lever, the second input lever, and the actuator are connected in series along the system.

17 Claims, 2 Drawing Sheets

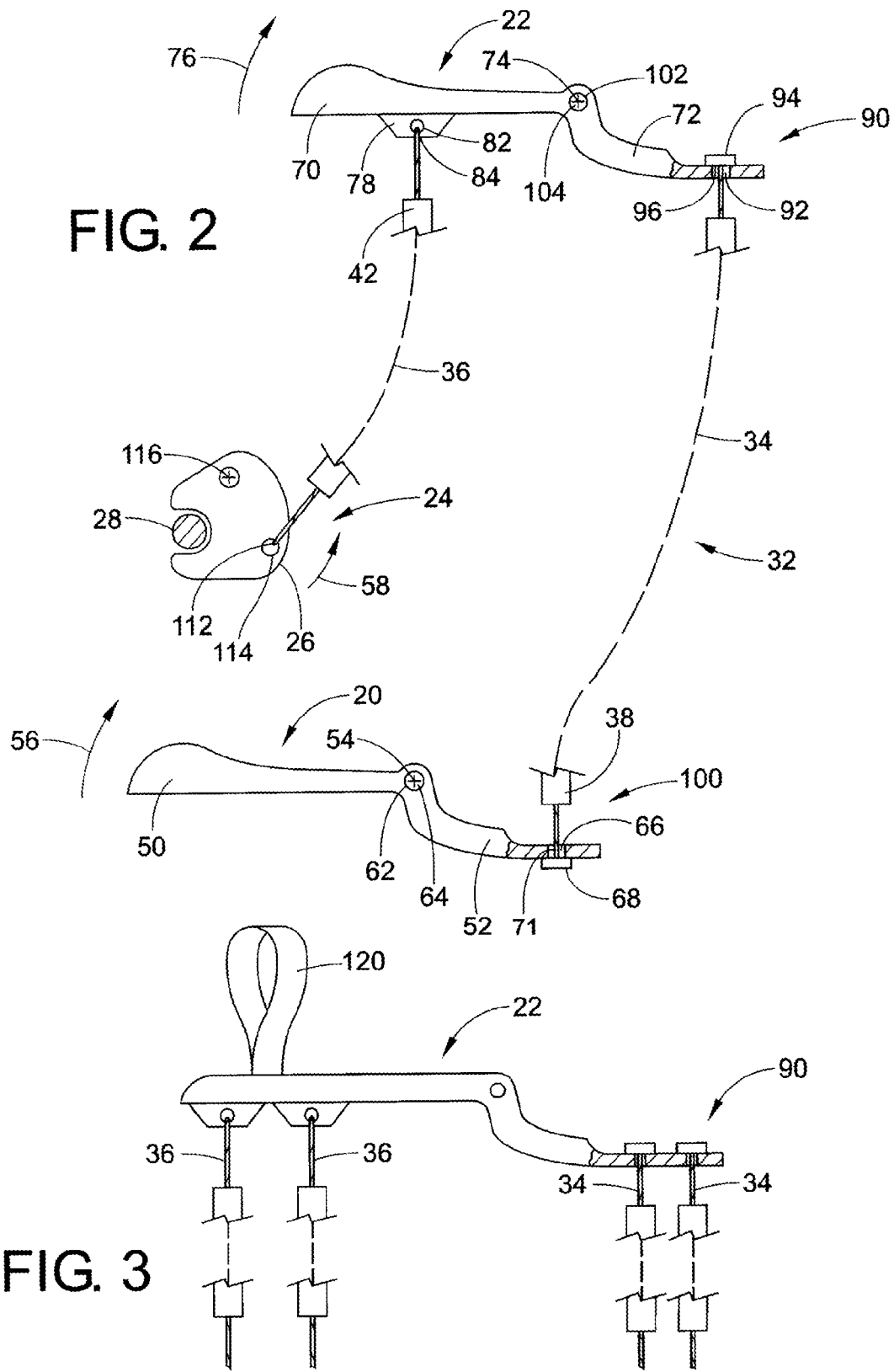

VEHICLE SEAT ASSEMBLY AND ACTUATOR SYSTEM FOR SAME

BACKGROUND

The present disclosure is related to vehicle seats. More particularly, the present disclosure is related to an actuator system for vehicle seats.

Typical cable layouts for vehicle seats can include multiple inputs connected with an actuator. These inputs can include levers, handles, and straps and the actuators can include recliner mechanisms and walk-in mechanisms. Multiple cables are used for linking each input with the actuator. Cable splitters and additional cable lengths are used to link the aforementioned inputs with each actuator. Cable splitters and additional cable lengths add cost and complexity to the assembly of the vehicle seat.

SUMMARY

An example of a vehicle seat assembly that can overcome at least one of the aforementioned shortcomings include a seat back, a seat base, a first input lever, a second input lever, an actuator, a latching mechanism, and a system connecting the first input lever, the second input lever and the actuator. The seat base connects with the seat back and is mounted to a vehicle floor. The input lever pivotally connects with at least one of the seat back and the seat base. The second input lever also pivotally connects with at least one of the seat back and the seat base. The actuator connects with at least one of the seat back and the seat base. The latching mechanism is for selectively locking movement of the seat back with respect to the seat base or for selectively locking movement of the seat base with respect to the vehicle floor. The latching mechanism is operably connected with the actuator such that movement of the actuator results in movement of the latching mechanism. The first input lever, the second input lever, and the actuator are connected in series along the system. Movement of the first input lever in a first releasing direction results in movement of the second input lever in a second releasing direction, which results in movement of the actuator in an unlatching direction. Movement of the second input lever in the second releasing direction results in movement of the actuator in the unlatching direction, but does not result in movement of the first input lever in the releasing direction.

An actuator system for a vehicle seat for allowing at least one of movement of a seat back with respect to a seat base and movement of a seat base with respect to a vehicle floor includes a first input lever, a second input lever, an actuator, a latching mechanism, a first cable, and a second cable. The first and second input levers each mount to the vehicle seat. The latching mechanism is operably connected with the actuator. The latching mechanism is for latching the seat back with respect to the seat base or for latching the seat base with respect to the vehicle floor. The first cable operatively connects the first input lever and the second input lever. The second cable operatively connects the second input lever with the actuator. Movement of the first input lever in a first releasing direction results in movement of the actuator in an unlatching direction. Movement of the second input lever in a second releasing direction results in movement of the actuator in the unlatching direction while not resulting in movement of the first input lever.

Another example of a vehicle seat assembly includes a seat back, a seat base, a first input lever, a second input lever, an actuator, a latching mechanism, and first and second cables. The seat base pivotally connects with the seat back and is mounted to a vehicle floor. The first input lever pivotally connects with the seat base. The second input lever pivotally connects with the seat back. The latching mechanism operably connects with the actuator. The latching mechanism is for latching the seat back with respect to the seat base or for latching the seat base with respect to the vehicle floor. The first cable connects the first input lever with the second input lever. The second cable connects the second input lever with the actuator. Movement of the first input lever in a first releasing direction results in the first cable pulling the second input lever which pulls the second cable to move the actuator in an unlatching direction. Movement of the second input lever in a second releasing direction pulls the second cable which results in movement of the actuator in the unlatching direction.

BRIEF DESCRIPTION OF THE DRAWINGS

FIG. 2 is a schematic depiction of the actuator system depicted in FIG. 1.

FIG. 3 is an alternative embodiment of an actuator system for a vehicle seat assembly.

DETAILED DESCRIPTION

Figure 1:
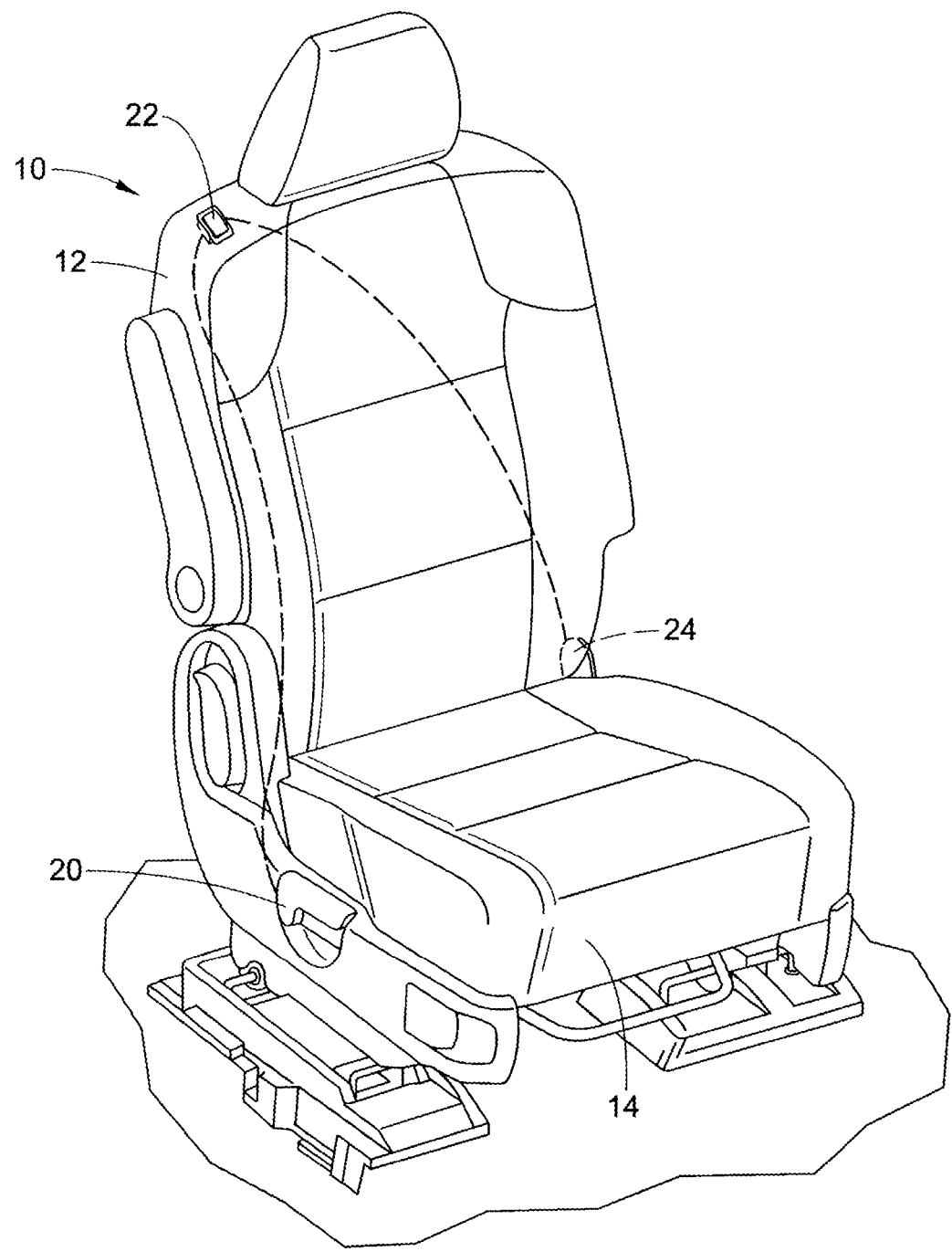
FIG. 1 is a perspective view of a vehicle seat assembly schematically depicting an actuator system for the vehicle seat assembly.

The description and drawings herein are merely illustrative and various modifications and changes can be made in the structures disclosed without departing from the scope of the appended claims. Identified components of a vehicle seat assembly and an actuator system described below are merely terms of art that may vary from one vehicle manufacturer to another and should not be deemed to limit the present disclosure or the appended claims.

Referring now to the drawings, where like numerals refer to like parts throughout the several views, FIG. 1 illustrates a vehicle seat assembly 10 including a seat back 12 and a seat base 14. In the illustrated embodiment, the seat back 12 is pivotally connected to the seat base 14 similar to a conventional vehicle seat such that the seat back is movable with respect to the seat base between an upright position (shown in FIG. 1.) and a folded position where the seat back folds towards the seat base. The seat base 14 mounts to a vehicle floor 16 in a conventional manner. In the illustrated embodiment, the seat base 14, and thus the vehicle seat assembly 10, is movable with respect to the vehicle floor 16. For example, the seat base 14 can slide in a forward and backward direction and, if desired, the seat base could pivot about strikers attached to the vehicle floor.

The vehicle seat 10 assembly further includes a first input lever 20 and a second input lever 22. In the example illustrated in FIG. 1, each input lever pivotally connects with at least one of the seat back 12 and the seat base 14. More particular to the example shown in FIG. 1, the first input lever 20 pivotally connects with the seat base 14 and the second input lever 22 pivotally connects with the seat back 12.

The vehicle seat assembly 10 also includes an actuator 24 connected with at least one of the seat back 12 and the seat base 14. The actuator 24 operates a latching mechanism 26 (FIG. 2). The latching mechanism 26 can be for selectively locking movement of the seat back 12 with respect to the seat base 14 or for selectively locking movement of the seat base 14 with respect to the vehicle floor 16. The latching mechanism 26 is operably connected with the actuator 24 such that movement of the actuator results in movement of the latching mechanism. As illustrated in FIG. 2, which merely schematically depicts connections between the first input lever 20, the second input lever 22 and the actuator 24, the actuator and the latching mechanism 26 are an integrally formed metal piece that cooperates with a striker or latch bolt 28. The striker or latch bolt 28 can mount to the seat base 14 (FIG. 1) where the latching mechanism 26 operates to lock movement of the seat back 12 with respect to the seat base 14. The striker or latch bolt 28 can also mount to the vehicle floor 16 where the latching mechanism 26 operates to lock movement of the seat base 14 with respect to the vehicle floor 16. In the illustrated embodiment, the actuator 24 and the latching mechanism 26 are a single metal piece; however, the actuator 24 could be a component separate from the latching mechanism 26 while still being operably connected to the latching mechanism for cooperation with the striker or latch bolt 28. Moreover, the actuator 24 and the latching mechanism 26 can take other configurations that are known to those skilled in the art that are conducive to operating with a system 32 that connects the first input lever 20, the second input lever 22 and the actuator 24.

The first input lever 20, the second input lever 22 and the actuator 24 are connected in series along the system 32 in the example depicted in FIG. 2. The system 32 as depicted in FIG. 2 is devoid of cable splitters and includes a first cable 34 connecting the first input lever 20 to the second input lever 22 and a second cable 36 connecting the second input lever 22 to the actuator 24. The cables 34, 36 depicted in FIG. 2 can be Bowden cables where a first sheath 38 surrounds a majority of the length of the first cable 34 and a second sheath 42 surrounds a majority of the length of the second cable 36. Even though cables 34 and 36 are depicted in FIG. 2, the system could employ other linkages, e.g. rods, to connect the first input lever 20, the second input lever 22 and the actuator 24.

With continued reference to FIG. 2, the first input lever 20 includes a handle portion 50 and a first cable connecting portion 52 disposed on an opposite side of a pivot axis 54 of the first input lever. In the illustrated embodiment, the first input lever 20 is integrally formed with the handle portion 50 for gripping by a vehicle passenger to operate the actuator 24. The operator pivots the first input lever 20 in a first releasing direction 56 to move the actuator 24 in an unlatching direction 58. In the illustrated embodiment, the first input lever 20 includes an opening 62 that receives a pivot pin 64 for pivotally attaching the first input lever to the seat base 14 (FIG. 1). In another embodiment the handle portion 50, the cable connecting portion 52 and the pivot pin 64 can be an integrally formed unit made of, for example, plastic. The cable connecting portion 52 includes a passage 66. The passage 66 is larger in diameter than the first cable 34, but smaller in diameter than a nipple 68 attached at a first end 71 of the first cable 34. The nipple 68 fixes the first end 71 of the first cable 34 to the first input lever 20 such that pivotal movement of the handle portion 50 in the first releasing direction 56 results in a tensile (downward per the orientation shown in FIG. 2) force on the first cable.

The second input lever 22 also includes a handle portion 70 and a first cable connecting portion 72 disposed on an opposite side of a pivot axis 74. In the illustrated embodiment, the second input lever 22 is integrally formed with the handle portion 70 for gripping by a vehicle passenger. A vehicle passenger can grip the handle portion 70 to move the second input lever 22 in a second releasing direction 76 which pulls the second cable 36 (upward per the orientation shown in FIG. 2) to move the actuator 24 in the unlatching direction 58. The second input lever 22 also includes a second cable connecting portion 78 which in the depicted embodiment depends downwardly from the handle portion 70 on the same side of the pivot axis 74 as the handle portion 70 as compared to the first cable connecting portion 72. The second cable connecting portion 78 includes an opening 82 and a first end 84 of the second cable 36 is inserted into the opening 82 for connecting the second cable 36 to the second input lever 22. The first end 84 of the second cable 36 can connect to the second cable connecting portion 78 in other conventional manners that allow movement of the handle portion 70 to move the second cable 36.

In the embodiment illustrated in FIG. 2, the system connecting the first input lever 20, the second input lever 22 and the actuator 24 also includes a slip joint 90. In the illustrated embodiment, the first cable 34 connects to the second input lever 22 via the slip joint 90. As seen in FIG. 2, the slip joint 90 can include an opening 92 associated with the second input lever 22 and a cable end member 94 (similar to the nipple 68) having a diameter larger than the opening. With reference to FIG. 2, a second end 96 of the first cable 34 is inserted through the opening 92 and connects with the cable end member 92. The opening 92 has a diameter larger than the diameter of the first cable 34 and a diameter smaller than the diameter of the cable end member 94. In the example illustrated in FIG. 2, the slip joint 90 is configured such that the first cable 34 pulls against the second input lever 22 resulting in movement of the second input lever in the second releasing direction 76 upon movement of the first input lever 20 in the first releasing direction 56. The slip joint 90 also allows movement of the second input lever 22 with respect to the first cable 34 when the second input lever is moved in the second releasing direction 76. This is due to the diameter of the opening 92 with respect to the diameter of the first cable 34 whereby movement of the second input lever 22 in the second releasing direction 76 allows the first cable 34 to "slip" with respect to the first cable. Accordingly, movement of the second input lever 22 in the second releasing direction 76 does not impart a compressive force (per the layout shown in FIG. 2) on the first cable 34 to inhibit buckling of the first cable and mitigate the likelihood of potential damage to the first cable.

The connection between the first input lever 20 and the first cable 34 can also be referred to as a slip joint 100 whereby downward (per the orientation shown in FIG. 2) movement of the first cable 34 not as a result of movement of the first input lever would result in the first cable and the end member 68 moving with respect to the first input lever 20 while not resulting in pivotal movement of the first input lever. For both slip joints 90 and 100, spacing the first sheath 38 a sufficient distance from the respective cable connecting portions 72 and 52 to allow for movement of the respective input lever 22 and 20 without contacting the first sheath can be desirable.

Referring back to the second input lever 22, the second input lever can include an opening 102 that receives a pivot pin 104 for pivotally attaching the second input lever 76 to the seat back 12 (FIG. 1). The handle portion 70, the first cable connecting portion 72, the second cable connecting portion 78 and the pivot pin 104 can be formed from an integrally molded piece of plastic, for example.

In the illustrated embodiment, a second end 112 of the second cable 36 is received in an opening 114 found in the actuator 24. The second end 112 of the second cable 36 can connect with the actuator in other conventional manners. The actuator 24 pivots about a pivot axis 116 in an unlatching direction 58 when pulled on by the second cable 36. The actuator 24 can be biased by a spring (not shown) in a direction opposite the unlatching direction 58, which urges the latching mechanism 26 to engage the striker or latch bolt 28. Similarly the first input lever 20 can be biased by a spring (not shown) in a direction opposite the first releasing direction 56 and the second input lever 22 can be biased by a spring (not shown) in a direction opposite the second releasing direction 76.

Movement of the first input lever 20 in the first releasing direction 56 results in movement of the second input lever 22 in the second releasing direction 76, which results in movement of the actuator 24 in the unlatching direction 58. Movement of the second input lever 22 in the second releasing direction 76 also results in movement of the actuator 24 in the unlatching direction 58; however, due to the slip joint 90 and/or the slip joint 100, movement of the second input lever 22 in the second releasing direction 76 does not result in movement of the first input lever 20 in the releasing direction. Moreover, movement of the second input lever 22 in the second releasing direction 76 does not result in movement of the first cable 34 or a compressive force to be exerted on the first cable. Accordingly, the first input lever 20, the second input lever 22, and the actuator 24 can be connected in series and the cable system 32 can be devoid of a cable splitter.

The slip joint 90 associated with the second input lever 22 in the illustrated embodiment is configured such that the first cable 34 pulls against the second input lever 22 upon movement of the first input lever 20 in the first releasing direction 56. The slip joint 90 also allows movement of the second input lever 22 with respect to the first cable 34 when the second input lever is moved in the second releasing direction 76. This is due to the opening 92 having a diameter larger than the diameter of the first cable 34 and the cable end member 94, which attaches the first cable 34 to the second input lever 22, being disposed on an opposite side of the first cable connecting portion 72 as the direction in which the first cable connecting portion 72 is moving when the second input lever is moved in the second releasing direction 76 (e.g., the cable end member 94 is located on an upper side of the cable connecting portion 72 and the cable connecting portion moves downward). As such, the first cable 34 can pull against the second input lever 22, but the second input lever does not push against the first cable.

As mentioned above, the first cable 34 operatively connects the first input lever 20 and the second input lever 22. Movement of the first input lever 20 in the first releasing direction 56 results in movement of the actuator 24 in the unlatching direction 56. Movement of the second input lever 22 in the second releasing direction 76 also results in movement of the actuator 24 in the unlatching direction 58 but does not result in movement of the first input lever 20. This is due to the slip joint 90 or the slip joint 100 and the second cable 36 operatively connecting the second input lever 22 with the actuator 24. In the embodiment depicted in FIG. 2, movement of the first input lever 20 in the first releasing direction 56 results in the first cable 34 pulling the second input lever 22 in the second releasing direction 76. Movement of the second input lever 22 in the second releasing direction 76 results in the second input lever pulling the second cable 36, which results in movement of the second input lever 22 with respect to the first cable 34.

Stated another way, movement of the first input lever 20 in the first releasing direction 56 results in the first cable 34 pulling the second input lever 22, which pulls the second cable 36 to move the actuator 24 in the unlatching direction 58. Movement of the second input lever 22 in the second releasing direction 76 pulls the second cable 36 which results in movement of the actuator 24 in the unlatching direction 58. Movement of the first input lever 20 in the first releasing direction 56 results in movement of the second input lever 22 in the second releasing direction 76; however, movement of the second input lever 22 in the second releasing direction 76 does not result in movement of the first input lever.

The first cable 34 can be referred to as an input cable connecting the first input lever 20 to the second input lever 22. The second cable 36 can be referred to as an actuator cable for connecting the second input lever 22 to the actuator 24. If desired, multiple input cables could connect with the second input lever 22 and multiple actuator cables could also connect with the second input lever. This is schematically depicted in FIG. 3. Each input cable 34 would connect with the second input lever 22 on an opposite side of the pivot axis 74 as compared to each actuator cable 36. Each input cable 34 could also connect with the second input lever via a slip joint 90. Moreover, the second input lever 22 could connect with a strap 120 which would allow the vehicle passenger to grasp the strap and pull the strap to operate the actuator 24.

A vehicle seat assembly and an actuator system for a vehicle seat have been described above with particularity. Modifications and alterations will occur to those upon reading and understanding the preceding detailed description. The invention, however, is not limited to only the embodiments described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly comprising:
a seat back;
a seat base connected with the seat back and mounted to a vehicle floor;
a first input lever pivotally connected with the seat base on a first side of the seat base;
a second input lever pivotally connected with the seat back adjacent a first side of the seat back;
an actuator connected with at least one of the seat back and the seat base and disposed adjacent a second side of the seat back or the seat base, the second side being opposite the first side;
a latching mechanism for selectively locking movement of the seat back with respect to the seat base or for selectively locking movement of the seat base with respect to the vehicle floor, the latching mechanism being operably connected with the actuator such that movement of the actuator results in movement of the latching mechanism;
a system connecting the first input lever, the second input lever and the actuator, wherein the first input lever, the second input lever and the actuator are connected in series along the system, wherein movement of the first input lever in a first releasing direction results in movement of the second input lever in a second releasing direction which results in movement of the actuator in an unlatching direction, wherein movement of the second input lever in the second releasing direction results in movement of the actuator in the unlatching direction but does not result in movement of the first input lever in the releasing direction, wherein the system includes a first cable connecting the first input lever and the second input lever and a second cable connecting the second input lever and the actuator.

2. The seat assembly of claim 1, further comprising a slip joint, wherein the first cable connects to the second input lever via the slip joint.

3. The seat assembly of claim 2, wherein the slip joint is configured such that the first cable pulls against the second input lever upon movement of the first input lever in the first releasing direction and the slip joint allows movement of the second input lever with respect to the first cable when the second input lever is moved in the second releasing direction.

4. The seat assembly of claim 3, wherein the slip joint includes an opening associated with the second input lever and a cable end member having a diameter larger than the opening.

5. The seat assembly of claim 1, wherein the system is a cable system, which is devoid of a cable splitter.

6. The seat assembly of claim 1, wherein each input lever is integrally formed with a handle portion for gripping by an associated vehicle passenger.

7. An actuator system for a vehicle seat for allowing at least one of movement of a seat back with respect to a seat base and movement of a seat base with respect to a vehicle floor, the system comprising:
a first input lever mounted to the vehicle seat;
a second input lever mounted to the vehicle seat;
an actuator;
a latching mechanism for latching the seat back with respect to the seat base or for latching the seat base with respect to the vehicle floor, the latching mechanism being operably connected with the actuator;
a first cable operatively connecting the first input lever and the second input lever, wherein movement of the first input lever in a first releasing direction results in movement of the actuator in an unlatching direction, wherein movement of the second input lever in a second releasing direction results in movement of the actuator in the unlatching direction while not resulting in movement of the first input lever; and
a second cable operatively connecting the second input lever with the actuator,
wherein the first cable connects with both the first input lever and the second input lever each via a respective slip joint;
wherein each input lever is pivotally mounted to the vehicle seat;
wherein the first input lever mounts to the seat base and the second input lever mounts to the seat back.

8. The system of claim 7, wherein each input lever includes an integrally formed handle.

9. The system of claim 7, wherein at least one of the input levers is connected with a strap, wherein a tensile force on the strap results in movement of the at least one input lever in the respective releasing direction.

10. The system of claim 7, wherein movement of the first input lever in the first releasing direction results in the first cable pulling the second input lever in the second releasing direction.

11. The system of claim 10, wherein movement of the second input lever in the second releasing direction results in the second input lever pulling the second cable and results in movement of the second input lever with respect to the first cable.

12. The system of claim 7, wherein the system is devoid of cable splitters.

13. The system of claim 7, wherein the second input lever connects with the vehicle seat via a pivot pin, wherein the first cable connects with the second input lever on a first side of the pivot pin and the second cable connects with the second input lever on a second, opposite, side of the pivot pin, such that downward movement of the first cable results in upward movement of the second cable.

14. A vehicle seat assembly comprising:
a seat back;
a seat base pivotally connected with the seat back and mounted to a vehicle floor;
a first input lever pivotally connected with the seat base;
a second input lever pivotally connected with the seat back;
an actuator;
a latching mechanism for latching the seat back with respect to the seat base or for latching the seat base with respect to the vehicle floor, the latching mechanism being operably connected with the actuator; and
a first and second cables, the first cable connecting the first input lever with the second input lever, the second cable connecting the second input lever with the actuator, wherein movement of the first input lever in a first releasing direction results in the first cable pulling the second input lever which pulls the second cable to move the actuator in an unlatching direction, wherein movement of the second input lever in a second releasing direction pulls the second cable which results in movement of the actuator in the unlatching direction.

15. The vehicle seat of the claim 14, wherein movement of the first input lever in the first releasing direction results in movement of the second input lever in the second releasing direction.

16. The vehicle seat of claim 15, wherein movement of the second input lever in the second releasing direction does not result in movement of the first input lever.

17. The vehicle seat of the claim 14, wherein movement of the first input lever in the first releasing direction results in the first cable pulling downward on the second input lever which pulls the second cable upward to move the actuator in the unlatching direction.

* * * * *